Feb. 13, 1923.
W. T. YOUNG.
POWER PLANT.
FILED DEC. 29, 1920.
1,445,381.
3 SHEETS—SHEET 1.
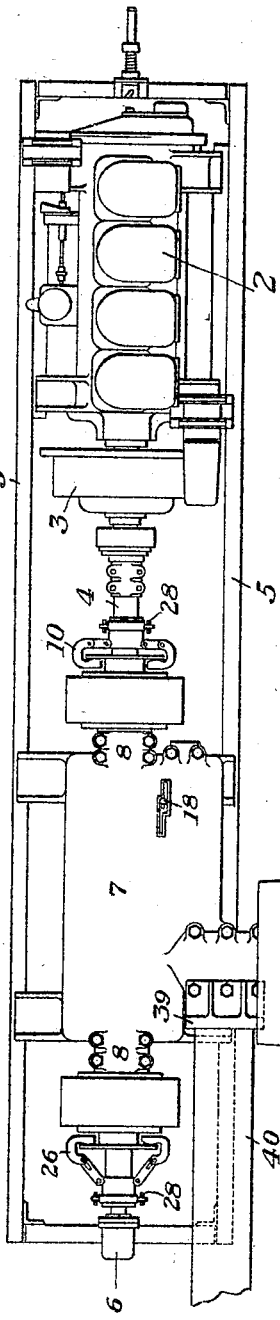
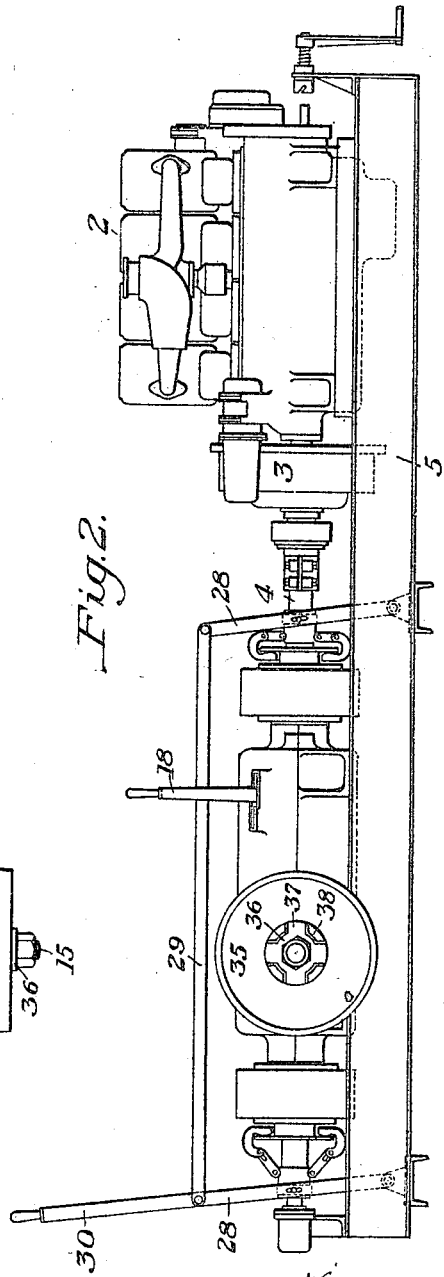
Inventor
William T. Young.
By Baker & Byrnes Parmelee
His Attorneys.

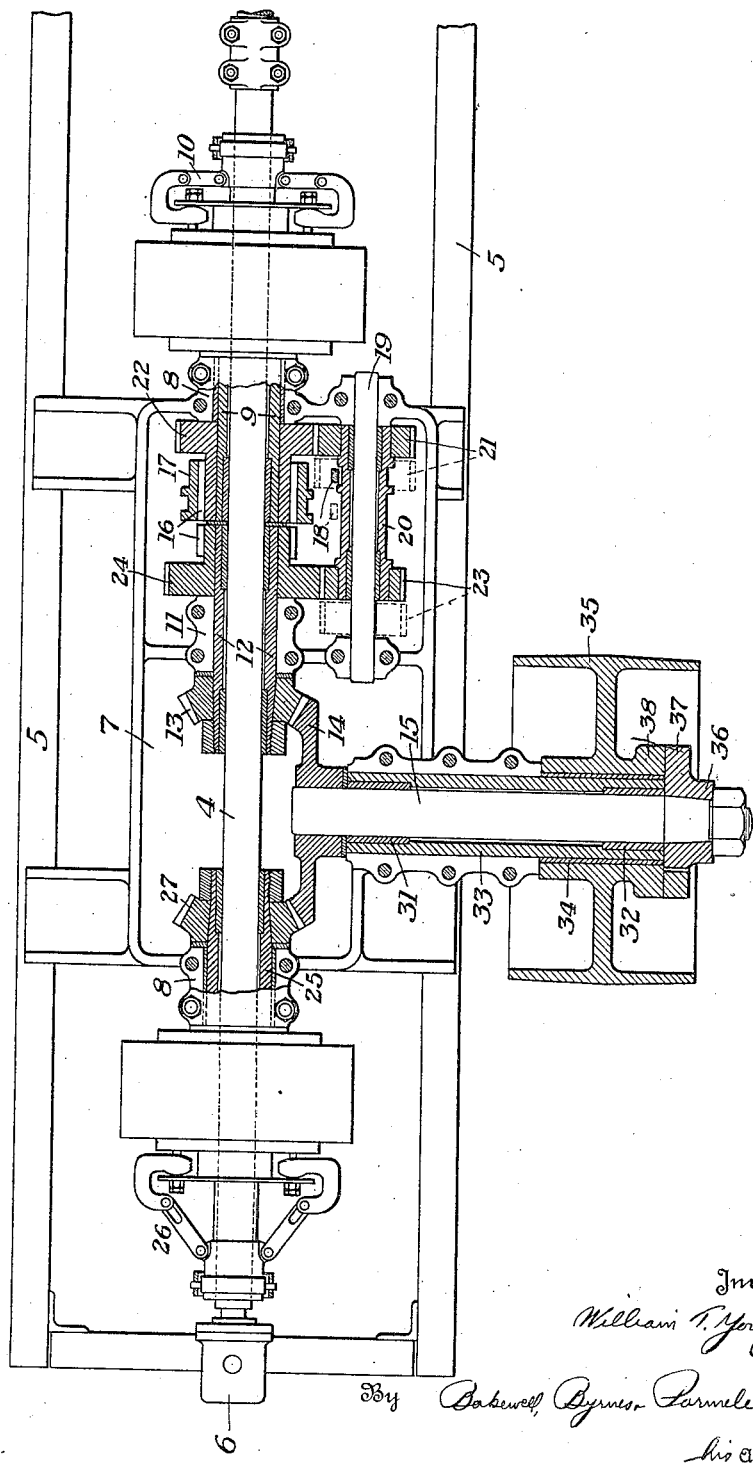

Feb. 13, 1923.
W. T. YOUNG.
POWER PLANT.
FILED DEC. 29, 1920.
1,445,381.
3 SHEETS—SHEET 3.
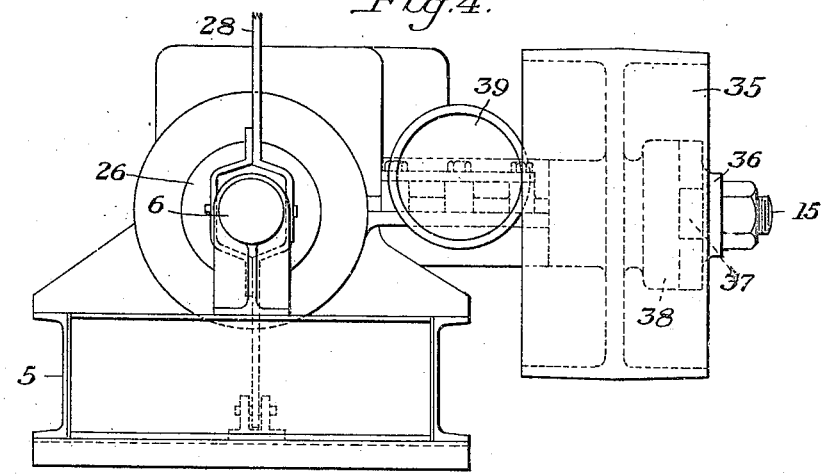
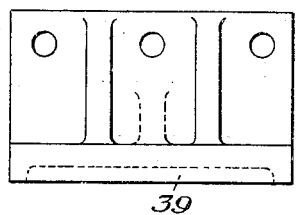
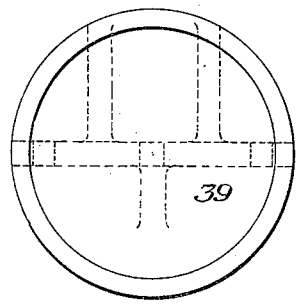
Inventor
William T. Young,
By Bakewell, Byrnes Parmelee,
his Attorneys.

Patented Feb. 13, 1923.

1,445,381

UNITED STATES PATENT OFFICE.

WILLIAM T. YOUNG, OF OIL CITY, PENNSYLVANIA.

POWER PLANT.

Application filed December 29, 1920. Serial No. 433,956.

*To all whom it may concern:*

Be it known that I, WILLIAM T. YOUNG, a citizen of the United States, residing in Oil City, in the county of Venango and State of Pennsylvania, have invented a new and useful Improvement in Power Plants, of which the following is a full, clear, and exact description.

The present invention relates broadly to power plants, and more particularly to power plants intended for use in connection with well drilling apparatus and the like.

An important object of the present invention is to provide an apparatus of the character referred to, having means for preventing the transmission of the lateral strains from the main drive pulley to its driving mechanism.

A further object of the invention is to provide a power plant having a belt pulley, gear or sprocket wheel with means for driving the same in a reverse direction at a fixed speed, or in a forward direction at varying speeds.

A still further object of the invention is to provide a compact construction having a minimum number of rotating parts and having a main, continuously rotating drive shaft from which power may be taken for driving the belt pulley, gear or sprocket wheel in either direction.

The foregoing and other objects, together with their attendant advantages will be apparent as the invention becomes better understood from the accompanying specification and drawings forming a part hereof, it being premised that various changes may be made in the details of construction without departing from the spirit of the invention as defined in the claims.

In the drawings,—

Figure 1 is a top plan view of a power plant constructed in accordance with the present invention.

Figure 2 is a side elevation of the construction illustrated in Figure 1.

Figure 3 is a plan view on an enlarged scale, partly broken away and partly in section, of a portion of the driving mechanism.

Figure 4 is an end view of the power plant.

Figures 5 and 6 are detail views, on enlarged scales, of the pocket for the bunting pole.

Referring more particularly to the drawings, there is illustrated a source of power, which preferably comprises a multi-cylinder, high speed, internal combustion engine 2 having a flywheel 3 and a longitudinally extending main drive shaft 4.

The entire power plant may be mounted on a frame 5, which may be supported in any desired manner for transportation or the like, and which has secured thereto an end bearing 6 for the drive shaft 4. At any desired point intermediate the flywheel and the end bearing, there may be mounted on the frame 5 a housing 7, which is preferably constructed in sections, as is customary with devices of this nature. In each end of the housing there is provided a bearing 8 through which extends the main drive shaft 4, as will be explained in detail hereinafter. Loosely surrounding the shaft 4, and journaled in one of the bearings 8, is a sleeve 9, adapted to be connected to the shaft 4 for rotation therewith, by means of a friction clutch 10 of any desired construction. Also loosely surrounding the shaft 4, and journaled in a second bearing 11 within the housing 7, is a second sleeve 12 carrying at its inner end a bevel gear 13 continuously meshing with a driven bevel gear 14 secured to the inner end of a transversely extending driven shaft 15.

When it is desired to rotate the shaft 15 at high speed in a forward direction, sleeves 9 and 12 are operatively connected by shifting the clutch ring 17 longitudinally on the gear 16 to cause the teeth of its internal gear to engage the teeth of the gear 16 on the sleeve 12, as indicated in dotted lines. This shifting movement may be accomplished by a handle 18, and directly couples the sleeves 9 and 12 causing the gear 13 to rotate at the same speed as the shaft 4.

At times, the conditions may be such that it is desirable to rotate the shaft 15 at a lower speed. For permitting this operation, there is journaled within the housing 7 a jack shaft 19 extending parallel to the shaft 4. Loosely surrounding the jack shaft is a sleeve 20 having secured to one end thereof a spur gear 21 adapted to mesh with a larger spur gear 22 on the sleeve 9. On the opposite end of the jack shaft is a similar spur gear 23 adapted to mesh with a spur gear 24 on the sleeve 12. It will be apparent that the gear ratio of the various spur gears is such that when the operating handle 18 is moved to bring the gears into the full line position shown in Figure 3, the gear 13 will be driven at a lower speed than the speed of the drive shaft.

For rotating the driven bevel gear 14 in a reverse direction, there is loosely journaled on the shaft 4, within the other bearing 8, a sleeve 25, corresponding to the sleeve 9, and adapted to be connected to the shaft for rotation therewith by means of a suitable clutch 26. At its inner end, the sleeve 25 carries a driving bevel gear 27, similar to the gear 13, continuously meshing with the driven gear 14.

For operating the respective clutches 10 and 26, for rotating the gear 14 in the desired direction, there are provided levers 28 pivotally mounted on the frame 5 and connected by a longitudinally extending link 29. One of the levers 28 may be provided with an operating handle 30 by means of which the levers may be moved in the desired direction. Due to the provision of the link 29 it will be obvious that simultaneous engagement of both of the clutches is impossible.

The driven shaft 15 is of the floating type and is journaled at its inner end in a bearing 31, and its outer in a bearing 32, both of which are carried in a shaft housing 33, rigidly secured to the housing 7 and forming a part thereof. At its outer end, the shaft housing 33 is provided with a bearing 34 for a main power pulley, gear or sprocket wheel 35. For rotating the power pulley from the shaft 15, there is provided a key 36, suitably splined to the shaft 15 and provided with projections 37 engaging recesses in the hub 38 of the pulley 35. Due to this construction, lateral strains produced on the pulley 35 are not transmitted to the gear 14, but are taken up by the shaft housing 33. The shaft 15 merely serves to rotate the belt pulley without forming a bearing therefor. This feature is highly desirable as it prevents a rapid wearing away of the bevel gear 14, such as ordinarily occurs in constructions in which the lateral strains are directly transmitted thereto.

For further bracing the shaft housing 33, there may be secured thereto a pocketed member 39 adapted to receive one end of the bunting pole 40, the opposite end of which may be braced in any desired manner.

The advantages of the present invention arise from the compact construction of the gearing, permitting operation of the belt pulley, gear or sprocket wheel in either direction, with means for driving in a forward direction at different speeds.

Further advantages arise from the means for preventing the transmission of lateral strains from the belt pulley to its driving mechanism.

I claim:

1. A power plant, comprising a source of power, a main drive shaft driven thereby, a plurality of driving bevel gears loosely carried by said shaft, a driven shaft extending at an angle to said drive shaft, a driven bevel gear on said driven shaft meshing with said driving gears, a power pulley cooperating with said driven shaft and adapted to be driven by said gears, means for rendering any of said driving gears operative for rotating the driven shaft in the desired direction, means for preventing the transmission of lateral strains from said power pulley to said gears, and a housing for said gears, said housing being split to receive and clamp said means in position, substantially as described.

2. A power plant, comprising a driving shaft, a driven shaft, bevel gears for transmitting rotational movement from said driving shaft to said driven shaft, a power pulley cooperating with said driven shaft, means preventing the transmission of lateral strains from said belt pulley to said bevel gears, and a sectional housing enclosing said gears and clamping said means in position, substantially as described.

3. A power plant, comprising a frame, a driving shaft journaled therein, a driven shaft, a shaft housing for said driven shaft supported by said frame, bevel gears for transmitting rotational movement from said driving shaft to said driven shaft, a sectional housing enclosing said gears and clamping said shaft housing in position, and a power pulley journaled on said shaft housing and operatively connected to said driven shaft, substantially as described.

4. A power plant, comprising a source of power, a main drive shaft driven thereby, a plurality of driving bevel gears loosely carried by said shaft, a driven shaft extending at an angle to said drive shaft, a driven bevel gear on said driven shaft meshing with said driving gears, a power pulley cooperating with said driven shaft and adapted to be driven by said gears, friction clutch means for rendering any of said driving gears operative for rotating the driven shaft in the desired direction, means preventing the movement of more than one of said friction clutch means to operative position at the same time, and means preventing the transmission of lateral strains from said power pulley to said gears, substantially as described.

5. A power plant, comprising a source of power, a main drive shaft driven thereby, a plurality of driving bevel gears loosely carried by said shaft, a driven shaft extending at an angle to said drive shaft, a driven bevel gear on said driven shaft meshing with said driving gears, a speed reduction device operatively connected intermediate one of said driving gears and the main drive shaft, a power pulley cooperating with said driven shaft, friction clutch means for rendering any of said driving gears operative for rotating the driven shaft in the desired direction, and means preventing the transmission of lateral strains from said power pulley to said gears, substantially as described.

6. A power plant, comprising a main drive shaft, a plurality of driving gears loosely mounted thereon, a speed reduction device operatively connected intermediate one of said gears and the main drive shaft, friction clutch means for rendering any of said driving gears operative, a driven shaft, a driven gear on said shaft meshing with all of said driving gears, a shaft housing for said driven shaft, and a power pulley operatively secured to said driven shaft and journaled on said housing, substantially as described.

7. A power plant, comprising a main drive shaft, a housing cooperating therewith, a plurality of sleeves journaled in said housing and loosely surrounding said shaft and forming supporting means therefor, friction clutch means for connecting one of said sleeves to the shaft for driving the same at a fixed speed therefrom, a plurality of means for connecting the other sleeve to said shaft for driving the same at different speeds therefrom, driving gears carried by each of said sleeves, a driven shaft having a gear meshing with said driving gears, and a housing for said driven shaft supported by said first mentioned housing, substantially as described.

8. In a power plant, a source of power, a main shaft driven thereby, a plurality of friction clutches mounted on said shaft in spaced relation, sleeves freely rotatable on said shaft intermediate said clutches and adapted to be operatively connected to said shaft by said clutches, a driving gear carried by each of said sleeves, a change speed gearing cooperating with one of said driving gears and operatively connected intermediate said main shaft and one of said sleeves, and a driven gear meshing with said driving gears, substantially as described.

9. A power plant, comprising a source of power, a main drive shaft driven thereby, a friction clutch mounted on said shaft, a sleeve adapted to be operatively connected to said shaft by said clutch, a second sleeve, means for operatively connecting said sleeves to cause the same to rotate at the same speed, a change speed gearing for operatively connecting said sleeves to cause the same to rotate at different speeds, and a drive gear carried by said second sleeve, substantially as described.

10. A power plant, comprising a source of power, a main drive shaft driven thereby, a friction clutch mounted on said shaft, a sleeve adapted to be operatively connected to said shaft by said clutch, a second sleeve, means for operatively directly connecting said sleeves to cause the same to rotate at the same speed, a change speed gearing for operatively connecting said sleeves to cause the same to rotate at different speeds, a drive gear carried by said second sleeve and a driven shaft operatively connected with said drive gear, substantially as described.

11. A power plant, comprising a source of power, a main drive shaft driven thereby, a plurality of friction clutches mounted on said shaft in spaced relation, sleeves rotatable on said shaft intermediate said clutches and adapted to be operatively connected to said shaft by said clutches, a driven shaft, a driven gear thereon, a driving gear on one of said sleeves meshing with said driven gear, an independent sleeve cooperating with another of said first mentioned sleeves, a driving gear on said independent sleeve meshing with said driven gear, and means for rotating said independent sleeve at different speeds irrespective of the speed of the main drive shaft, substantially as described.

12. A power plant, comprising a source of power, a main drive shaft driven thereby, a plurality of friction clutches mounted on said shaft in spaced relation, sleeves rotatable on said shaft intermediate said clutches and adapted to be operatively connected to said shaft by said clutches, a driven shaft, a driven gear thereon, a driving gear on one of said sleeves meshing with said driven gear, an independent sleeve cooperating with another of said first mentioned sleeves, a driving gear on said independent sleeve meshing with said driven gear, and means for rotating said independent sleeve at different speeds and in opposite directions, irrespective of the speed of the main drive shaft, substantially as described.

13. A power plant, comprising a main drive shaft, a sleeve freely rotatable thereon, a second sleeve freely rotatable thereon in co-operative relation to said first mentioned sleeve, teeth on the adjacent ends of said sleeves, a clutch ring movable into engagement with the teeth on both of said sleeves, means for operatively connecting one of said sleeves to the drive shaft, a driver's shaft, and means for operatively connecting the other of said sleeves to the driver's shaft, substantially as described.

14. A power plant comprising a main drive shaft, a sleeve freely rotatable thereon, a second sleeve freely rotatable thereon in co-operative relation to said first mentioned sleeve, teeth on the adjacent ends of said sleeves, a clutch ring movable into engagement with the teeth on both of said sleeves, means for operatively connecting one of said sleeves to the drive shaft, a driver's shaft, means for operatively connecting the other of said sleeves to the driver's shaft, and a change speed gearing for operatively connecting said sleeves independently of said clutch ring, substantially as described.

In testimony whereof, I have hereunto set my hand.

WILLIAM T. YOUNG.